United States Patent [19]
Chiang et al.

[11] Patent Number: 5,772,867
[45] Date of Patent: Jun. 30, 1998

[54] FLUID FILTERING MACHINE WITH FILTERING MEMBRANE CONTROLLED BY PLC

[76] Inventors: Hsu-Hsin Chiang, No. 141 San Min Road, Sec. 3, Taichung City, Taiwan; Jusuf-Utomo Du, Kedoya Angsana Ruko Tomang, Tol Blok II No. 42, Taman Kedoya Baru Jakarta 11520, Indonesia

[21] Appl. No.: 815,610

[22] Filed: Mar. 12, 1997

[51] Int. Cl.$^6$ .......................... B01D 17/12; B01D 37/02
[52] U.S. Cl. ......................... 210/90; 210/104; 210/141; 210/193; 210/195.1; 210/257.1; 210/778
[58] Field of Search .......................... 210/90, 104, 105, 210/108, 120, 134, 141, 143, 193, 195.1, 195.2, 195.3, 196, 257.1, 257.2, 258, 259, 321.65, 321.69, 321.87, 409, 411, 414, 472, 424–427, 777, 778, 805, 806

[56] References Cited

U.S. PATENT DOCUMENTS

| | | | |
|---|---|---|---|
| 2,025,570 | 12/1935 | Clark | 210/193 |
| 2,455,130 | 11/1948 | Lomax | 210/778 |
| 2,971,648 | 2/1961 | Lane et al. | 210/778 |
| 3,679,052 | 7/1972 | Asper | 210/193 |
| 3,680,699 | 8/1972 | MacPherson | 210/778 |
| 4,514,306 | 4/1985 | Pato | 210/778 |
| 5,300,234 | 4/1994 | Oeschle et al. | 210/778 |

*Primary Examiner*—Joseph W. Drodge
*Attorney, Agent, or Firm*—Rosenberg, Klein & Bilker

[57] ABSTRACT

A fluid filtering machine is provided with a filtering membrane made up of filtering substance that collects on a filtering core in a filtering tank and is controlled by a programmable logic controller. The machine includes a raw water tank, a purified water tank, a primary debris strainer, a working pump, a filtering substance supplying tank, the filtering tank, a concentrated debris tank and the programmable logic controller. Wherein the combination of the above mentioned components with input from pressure switches, each of a number of solenoids and an actuating rod actuated by a motor can be accurately and precisely controlled by the controller to control flow through set procedures of machine operation. The procedures include filtering, retro-cleaning, formation of the filtering membrane and supplying of the filtering substance. These procedures can be properly set to operate to operate at preset times and for preset durations, also the filtering substance can be homogeneously deployed and an accurate physical filtering effect can be therefore attained.

1 Claim, 5 Drawing Sheets

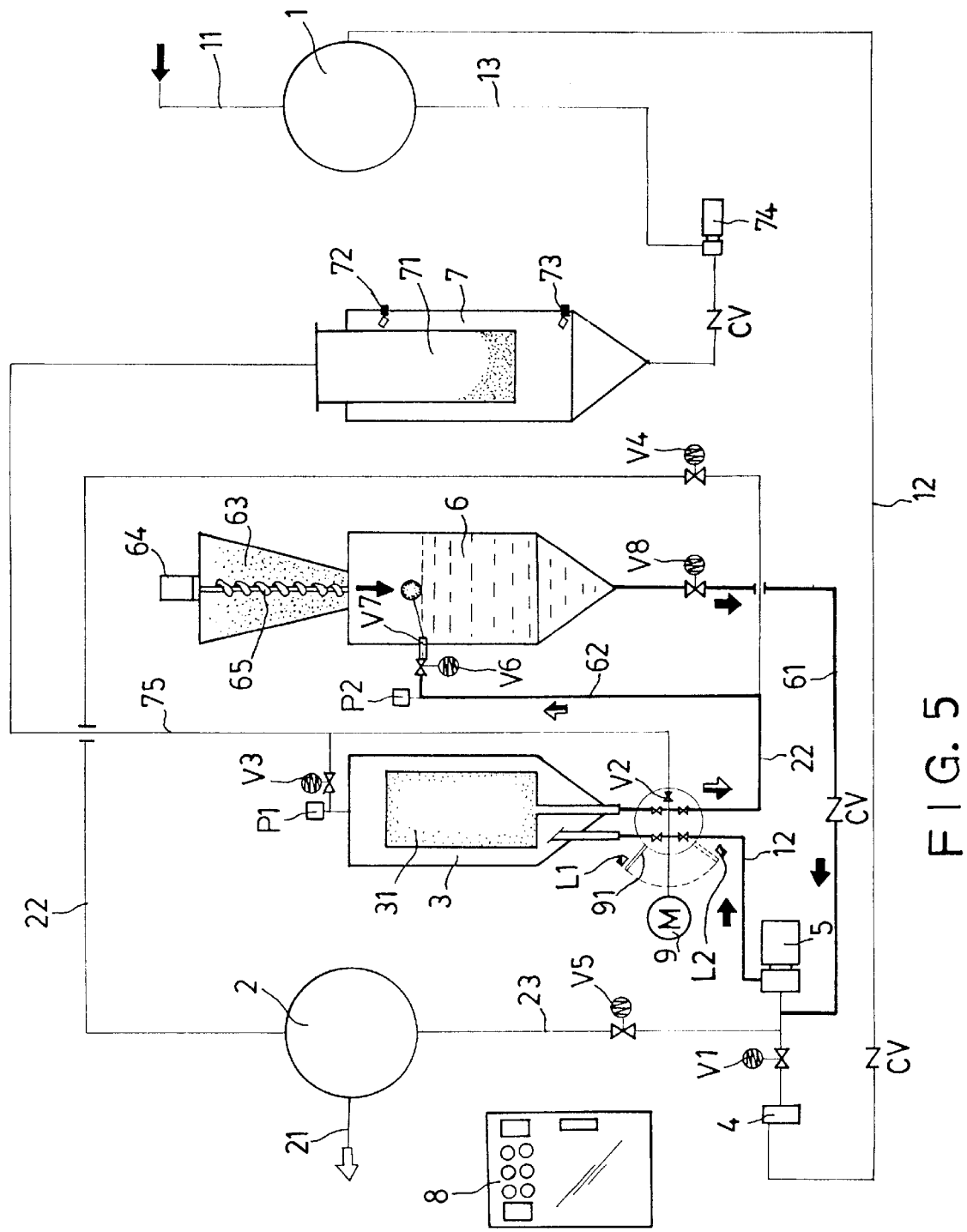
F I G. 5

FLUID FILTERING MACHINE WITH FILTERING MEMBRANE CONTROLLED BY PLC

FIELD OF THE INVENTION

The present invention relates to a fluid filtering machine having a filtering core with a filtering membrane controlled by with programmable logic controller (PLC), wherein the opening/closing of each of the components and the actuating duration of the machine are controlled by PLC. Consequently, a homogenous and complete filtering membrane is formed at the surface of the filtering core. As a result, fluid containing debris can be accurately physically filtered.

DESCRIPTION OF PRIOR ART

The conventional filtering machine has a poor performance resulting from the filtering core being not provided with an even and complete coated filtering membrane. Consequently, debris is passing through the holes on the filtering membrane. In light of this, an excellent filtering performance requires the formation of a filtering membrane. If the filtering core is provided and coated with an even and complete filtering membrane, the debris within the fluid can be thoroughly physically filtered.

Normally, the filtering core is made from silicone algae soil resulting from plant fossil. Silicone algae soil has a large internal particulate interstitial passage within a given unit volume. Consequently, the debris within the fluid can be completely filtered by the silicone algae soil and a purified fluid is attained through use of it. Accordingly, it is believed that the silicone algae soil has the best filtering effect and performance. Consequently, the silicone algae soil has been widely used on many types of filtering machines. Nevertheless, a problem has been found in the formation of the filtering membrane since the existing and conventional process can not provide a homogenous and complete filtering membrane. As a result, the excellent filtering performance of the silicone algae is negatively effected. It is believed that the formation of a filtering membrane is an important process for the filtering process.

SUMMARY OF THE INVENTION

It is the object of this invention to provide a fluid filtering machine for coating a layer on the filtering core with a programmable logic controller (PLC), wherein the opening/closing of each of the components and the actuating duration of the machine are controlled by the PLC. Consequently, a homogenous and complete filtering membrane is coated to the surface of the filtering core. As a result, the fluid can be accurately physically filtered.

BRIEF DESCRIPTION OF DRAWINGS

In order that the present invention may more readily be understood the following description is given, merely by way of example with reference to the accompanying drawings, in which:

FIG. 5 is an illustration for adding filtering material for a membrane formation process.

DETAILED DESCRIPTION OF PREFERRED EMBODIMENT

Figure 1:
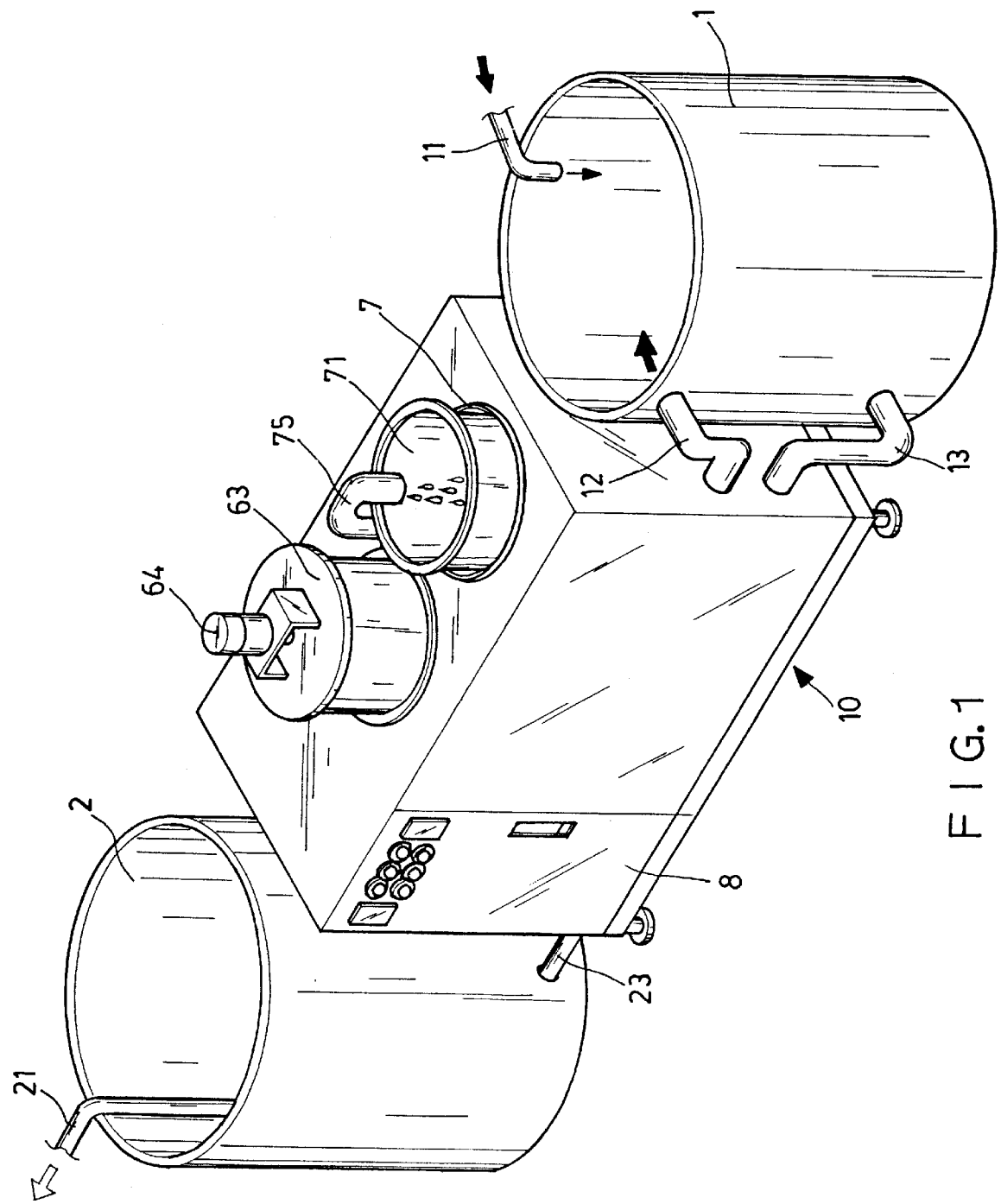
FIG. 1 is a perspective view of the present invention.
Figure 2:
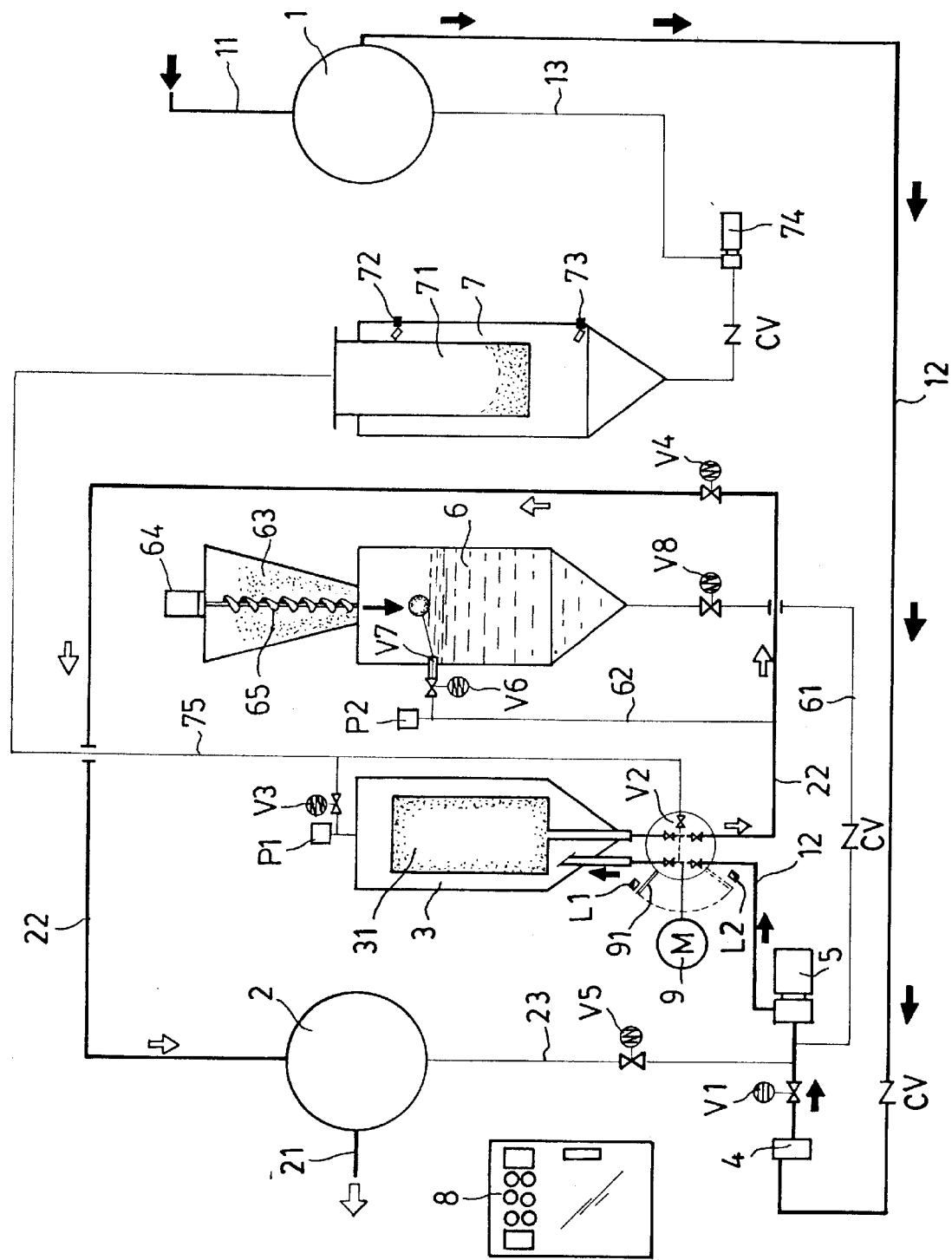
FIG. 2 is a normal filtering processes made according to this invention.
Figure 3:
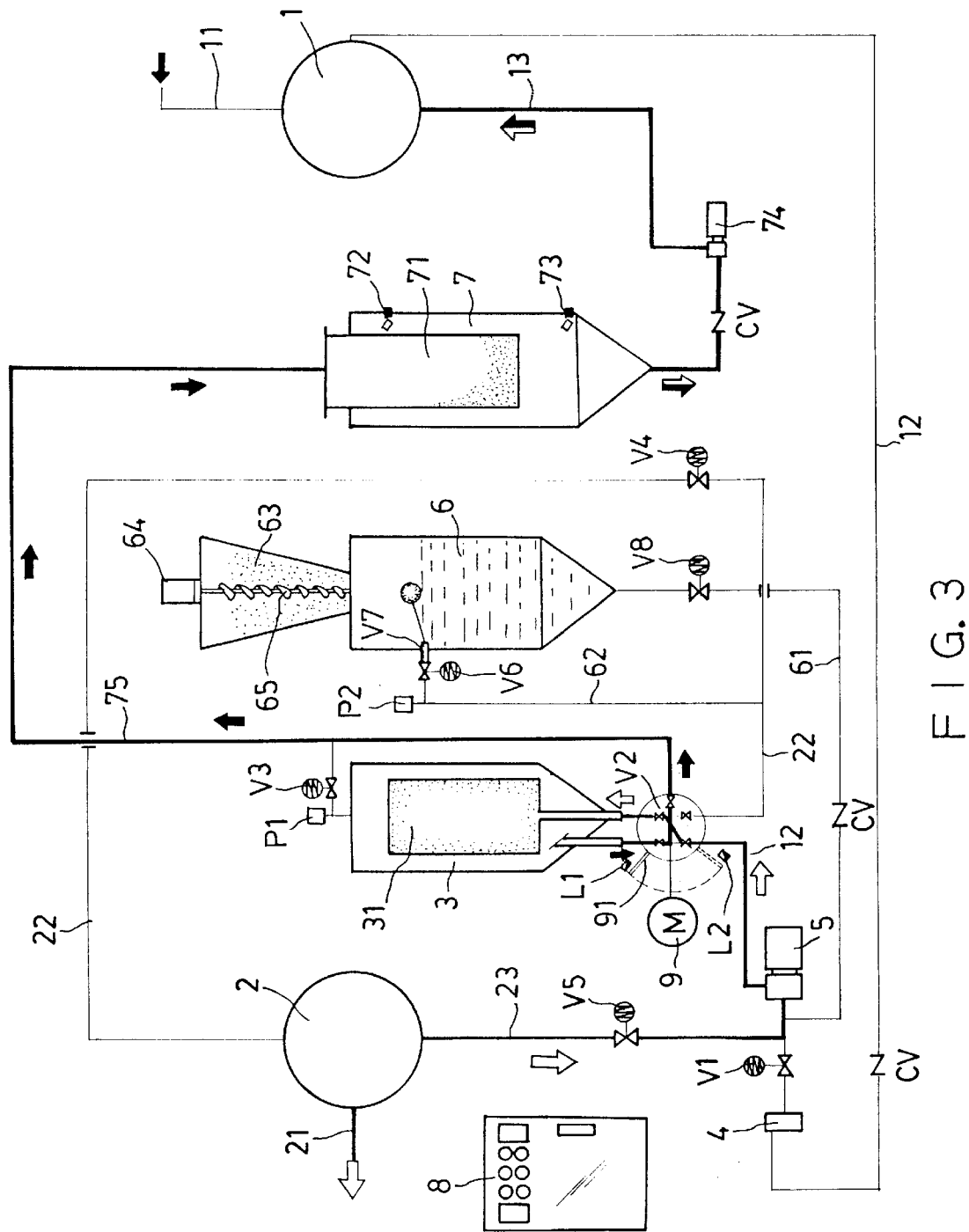
FIG. 3 is an illustration for a retro-cleaning processe.
Figure 4:
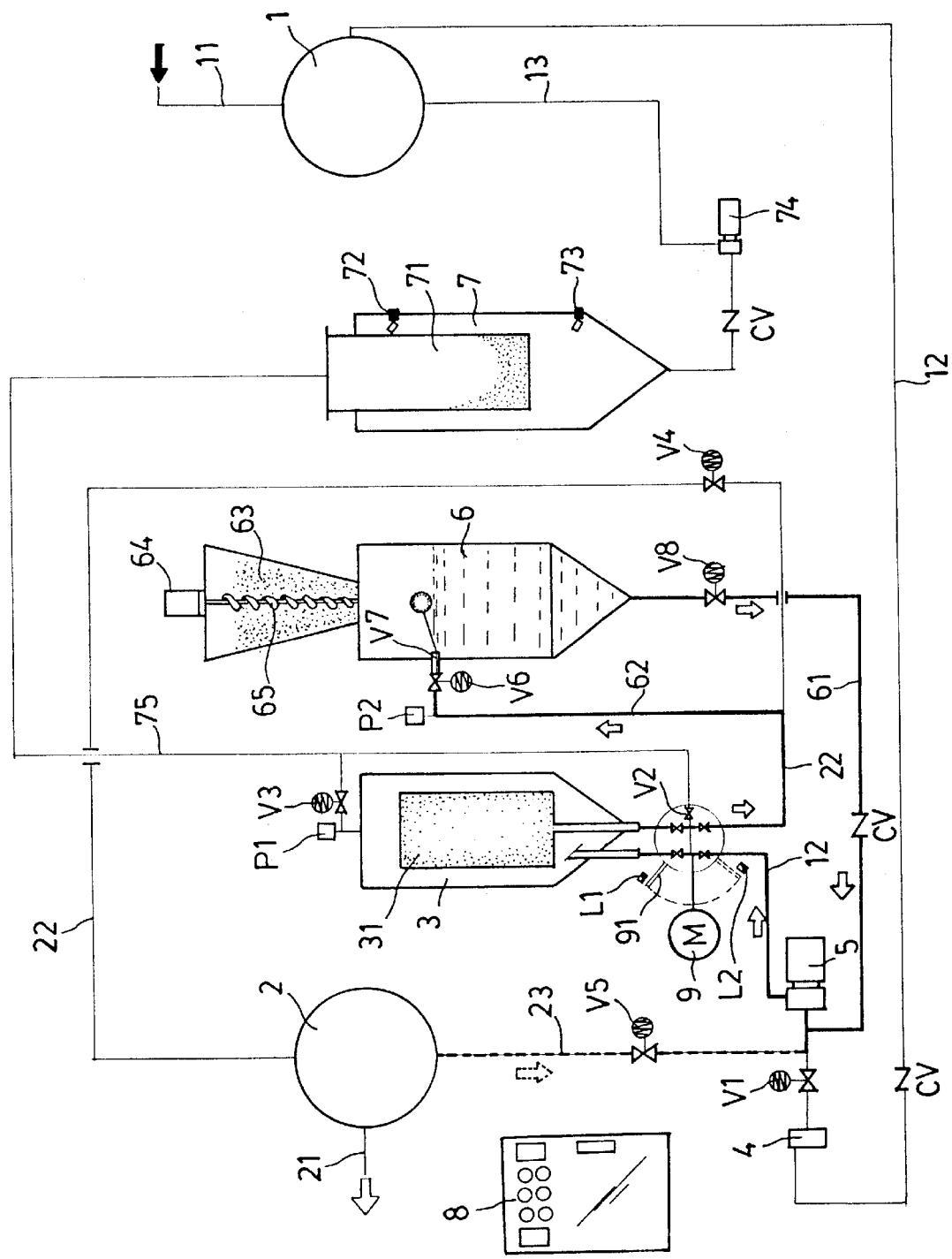
FIG. 4 is an illustration of membrane formation in a primary process of the present invention.

Referring to attached drawings, the fluid filtering machine generally comprises elements described herein.

A raw water tank (1) for containing un-filtered raw water is provided. The raw water tank (1) is connected with an inlet pipe (11) for water supplying, an outlet pipe (12) for supplying the raw water to a filtering tank (3), and a returning inlet pipe (13);

A purified water tank (2) for containing filtered water is provided. The purified water tank (2) is connected with a purified water outlet pipe (21) and a purified water inlet pipe (22). A retro-cleaning auxiliary inlet pipe (23) is connected with the outlet pipe (12) of the raw water tank (1).

A filtering tank (3) containing a filtering net core (31) is provided.

A primary debris strainer (4) is disposed at a suitable position along the outlet pipe (12) of the raw water tank (1). Debris with relative larger size can be filtered by this primary strainer (4).

A working pump (5) is coupled to the outlet pipe (12) of the raw water tank (1) and downstream of the strainer (4). Accordingly, the raw water within the raw water tank (1) can be delivered to the filtering tank (3).

A filtering substance supplying tank (6) is provided. The filtering substance supplying tank (6) is connected with a first circulating circuit (61) to the outlet pipe (12) of the raw water tank (1). From a position adjacent to the top of the supplying tank (6), a second circulating circuit (62) is connected to the purified water inlet pipe (22) of the purified water tank (2).

A concentrated debris tank (7) is provided and contains a recycling cylinder (71). Upper and lower level controllers (72, 73) are provided and the top of the concentrated debris tank (7) is also connected with a recycling circuit (75). The bottom of the concentrated debris tank (7) is connected with a pump (74) for delivering the fluid within the concentrated debris tank (7) back to the returning inlet pipe (13) of the raw water tank (1).

A programmable logic controller (8) is provided and disposed at a suitable position on the fluid filtering machine. The controller (8) is used to control flow through each of the components and actuations and operational durations of the machine.

The fluid filtering machine is also characterized by the additional elements described herein. The outlet pipe (12) of the filtering tank (3) and the outlet pipe (22) of the purified water tank (2) and the recycling circuit (75) are all connected with a five-port-two-way valve (V2). This five-port-two-way valve (V2) is connected with an actuating rod (91) to be actuated by a motor (9). A pair of micro switches (L1) and (L2) are disposed adjacent to the actuating rod (91). The filtering tank (3) is provided with a pressure switch (P1) and a solenoid (V3) for air releasing.

The filtering substance supplying tank (6) is disposed with a hopper (63). By means of a screw conveyor (65) actuated by a motor (64), the filtering substance within the hopper (63) can be supplied to the supplying tank. In a connection between the filtering substance supplying tank (6) and the second circulating circuit (62), a solenoid (V6) and a float ball water flow controlling valve (V7) are provided. The second circulating circuit (62) is also provided with a pressure switch (P2). The first circulating circuit (61) is provided with a solenoid (V8).

In addition, downstream of the primary debris strainer (4) and upstream of the retro-cleaning auxiliary inlet pipe (23), a solenoid (V1) is provided. The retro-cleaning auxiliary inlet pipe (23) is also provided with a solenoid (V5). The purified water inlet pipe (22) is also provided with a solenoid (V4).

Each of the forementioned solenoids are controlled by the programmable logic controller (8).

The pressure switches (P1, P2) provide input to the controller (8). Each of the solenoids (V1–V8) and the actuating rod (91) actuated by the motor (9) can thus be accurately and precisely controlled by the programmable logic controller (8) according to the a predetermined procedure. In light of this, operations of filtering, retro-cleaning, formation of filtering membrane and supplying of filtering substance can each be properly set to operate at a preset time and for a preset duration. By the provision of the present invention, the filter substance can be homogeneously deployed and an accurate physical filtering effect can be therefore attained.

Those components and devices can be assembled within a housing (10) except for the raw water tank (1) and the purified water tank (2). The hopper (63) can be disposed above the housing (10) and combined with the programmable logic controller (8) and the housing (10) to build a complete and compact filtering machine.

Each of the above described pipes and circuits can be also provided with a check valve (CV) as necessary.

The operational procedure and the intended performance are detailed described as below.

1. Normal Filtering Procedure

The raw water is drained out from the outlet pipe (12) from the raw water tank (1) and flows over a check valve (CV). The debris of larger size is firstly filtered by the primary debris strainer (4). Afterward, the strained raw water flows through the solenoid (V1), working pump (5), and the five-port-two-way valve (V2) which is set to filtering position L1, and into the filtering tank (3). As the strained raw water flows over the filtering membrane (A) deployed at the outer surface of the filtering net core (31), the debris within the raw material is completely filtered. Afterward, the purified water flows over the five-port-two-way valve (V2) and into the purified water tank (2) via the purified water outlet pipe (22) and the solenoid (V4).

2. Retro-cleaning Procedure

When the debris are piled and accumulated on the filtering membrane (A) of the filter net core (31), the water flow which penetrates the membrane (A) of the filtering net core (31) is limited. As a result, the pressure within the system is increased. When the pressure level exceeds the setting of the pressure switch (P1), the solenoid (V1) is closed and the five-port-two-way valve (V2) is switched to the retro-cleaning position (L2). In this retro-cleaning procedure backward water flow is drained through the auxiliary pipe (23) from the purified water tank (2) and flows through the solenoid (V5), working pump (5), five-port-two-way valve (V2) and into the inner space of the filtering net core (31). Accordingly, the water flow is from the inner space to the outer surface of the core, consequently, the debris attached on the filtering membrane (A) of the filtering net core (31) is flushed. Afterward, the cleaning water together with the debris flows through the five-port-two-way valve (V2) and into the recycling cylinder (71) of the concentrated debris tank (7) via the recycling circuit (75). The quantity of the debris is controlled by the upper and lower level controllers (72, 73) and the debris are filtered by a woven filter (not shown) within the recycling cylinder (71). Afterward, the filtered water flows over a check valve (CV), working pump (74), returning pipe (13) and back to the raw water tank (1) to complete the retro-cleaning procedure.

3. Formation of the Filtering Membrane Procedure

Firstly, the motor (9) is actuated to set the five-port-two-way valve (V2) in the filtering position (L1). Afterward, the membrane-formation water drains out from the auxiliary pipe (23) of the purified water tank (2), and flows through the solenoid (V5), working pump (5) and five-port-two-way valve (V2) and into the filtering tank (3). Then the water flows into the filtering net core (31) and out from the bottom of the filtering net core (31). Then the water flows through the five-port-two-way valve (V2) of the second circulating circuit (62), solenoid (V6), and float ball water flow controlling valve (V7) and into the filtering substance supplying tank (6). Afterward, the water flows through the first circulating circuit (61) from the filtering substance supplying tank (6), solenoid (V8), a check valve (CV), and working pump (5) for circulating. During the circulating, the membrane-formation water flow is supplied by the purified water tank (2). The water within the filtering tank (3) is full and the level of water in the filtering substance tank (6) reaches the level of the float ball water flow controlling valve (V7). As the level of the float ball of the valve rises, the water flow through the valve is decreased. As a result, the pressure at the pressure switch P2 is increased. When the pressure level reaches to the setting point of the pressure switch P2, the solenoid (V5) is closed while the membrane-formation water flow is still circulating. Meanwhile, the solenoid (V3) is opened to release the air generated during the circulating.

4. Adding Filtering Substance for Membrane Formation Procedure

The filtering substance is added from the hopper (63). By the actuation of the screw conveyor (65) with the motor (64), the filtering substance is added to the filtering substance supplying tank (6) in a metered manner. Afterward, the filtering substance is moved together with a flow of circulating membrane formation water to the filtering net core for formation of the filtering membrane. The particles of larger size are firstly strained by the filtering net core (31) and deployed on the outer surface of the filtering net core (31), while the particles with small size will pass through the filtering net core (31) and circulate with the water flow. Afterward, as the passages on the outer surface of the filtering net core (31) become smaller and smaller, the tiny particles will also adhere onto the outer surface of the filtering net core (31). Accordingly, a size gradient of particles of the filtering substance is formed on the outer surface of the filtering net core (31). Finally, the filtering membrane (A) with a thickness of 2 mm is formed.

Because the membrane formation is attained during a circulating water flow and the air is ventilated from the solenoid (V3) which is actuated to open periodically, the completeness and integrity of the filtering membrane is kept and attained. When the membrane formation procedure is completed, the system resumes to the normal filtering procedure. Consequently, actuation and duration of the opening/closing of the solenoids (V1–V8), and the position of the actuating rod (91), the motor (9), the screw conveyor (65), the motor (64) and the working pump (74) are all precisely controlled by the programmable logic controller (8) according to preset procedures. In fact, the timing of each working procedure is precisely calculated and controlled, consequently, the solenoids (V1–V8), the motors (9, 64) and the working pump (74) are operated in a coordinated manner with preset time and interval. As a result, each procedure can be suitably and properly executed and completed smoothly and precisely. Also, a homogeneous and even filtering membrane can be attained and an accurate physical filtering effect can therefore be attained.

As compared with the conventional filtering machine, the filtering machine made according to this invention can be concluded with the following advantages.

Firstly, the membrane formation is attained during the circulating of water flow including water supplied by the purified water. Secondly, the air trapped within the circulating water flow is released and ventilated by a solenoid periodically, consequently, a more even and integral filtering membrane can be readily attained as compared with the conventional procedures. Thirdly, each and every working procedure is precisely controlled by the programmable logic controller which is superior to the conventional semi-automatic or manual operating systems. The operating procedures progress more smoothly and the performance is higher also. Even if a failure occurs during a procedure the programmable logic controller will start a membrane formation procedure automatically to ensure the integrity of the filtering membrane. The filtering quality is therefore ensured.

We claim:

1. A fluid filtering machine with a filtering membrane controlled by a programmable logic controller comprising:

a raw water tank for containing un-filtered raw water, said raw water tank being connected with an inlet pipe for water supplying, an outlet pipe for supplying the raw water to a filtering tank and a returning inlet pipe;

a purified water tank for containing filtered water, said purified water tank connected with a purified water outlet pipe, a purified water inlet pipe and a retro-cleaning auxiliary inlet pipe which is connected with said outlet pipe of said raw water tank;

a filtering tank containing a filtering core having said membrane;

a primary debris strainer disposed along said outlet pipe of said raw water tank, wherein debris with relatively larger size can be filtered by said primary strainer;

a working pump coupled to said outlet pipe of said raw water tank and downstream of said strainer for delivering the raw water within said raw water tank to said filtering tank;

a filtering substance supplying tank, said filtering substance supplying tank being connected with a first circulating circuit to said outlet pipe of said raw water tank and from a position adjacent to the top of said filtering substance supplying tank and a second circulating circuit connected to said purified water inlet pipe of said purified water tank;

a concentrated debris tank provided with a recycling cylinder, upper and lower level controllers being also provided, the top of said concentrated debris tank being connected with a recycling circuit and the bottom of said concentrated debris tank being connected with a working pump for delivering fluid from said concentrated debris tank back to said returning inlet pipe of said raw water tank; and a programmable logic controller which is used to control and actuate flow through the machine;

characterized in that said outlet pipe of said filtering tank, said outlet pipe of said purified water tank and said recycling circuit all being connected with a five-port-two-way valve, wherein the five-port-two-way-valve is connected with an actuating rod to be actuated by a motor, wherein a pair of microswitches are disposed adjacent to said actuating rod and wherein said filtering tank is connected to a pressure switch and a solenoid for air releasing;

said filtering substance supplying tank being connected with a hopper, wherein by means of a screw conveyor actuated by a motor, filtering substance within the hopper can be supplied to the supplying tank, and wherein in a connection between said filtering substance supplying tank and a second circulating circuit, a solenoid and a float ball water flow controlling valve are provided, said second circulating circuit being also provided with a pressure switch, said first circulating circuit being provided with a solenoid;

in a position downstream of said primary debris strainer and upstream of said retro-cleaning auxiliary inlet pipe, a solenoid is provided, said retro-cleaning auxiliary inlet pipe being also provided with a solenoid, said purified water inlet pipe being also provided with a solenoid;

each of the solenoids being controlled by said programmable logic controller;

wherein through input from the pressure switches, each of said solenoids and said actuating rod actuated by the corresponding motor can be accurately and precisely controlled by said programmable logic controller according to a predetermined procedure, consequently, operations of filtering, retro-cleaning, formation of the filtering membrane and supplying of said filtering substance can each be properly set at a preset time and for a preset duration, the filtering substance can be homogeneously deployed and an accurate physical filtering effect can be therefore attained.

* * * * *